UNITED STATES PATENT OFFICE.

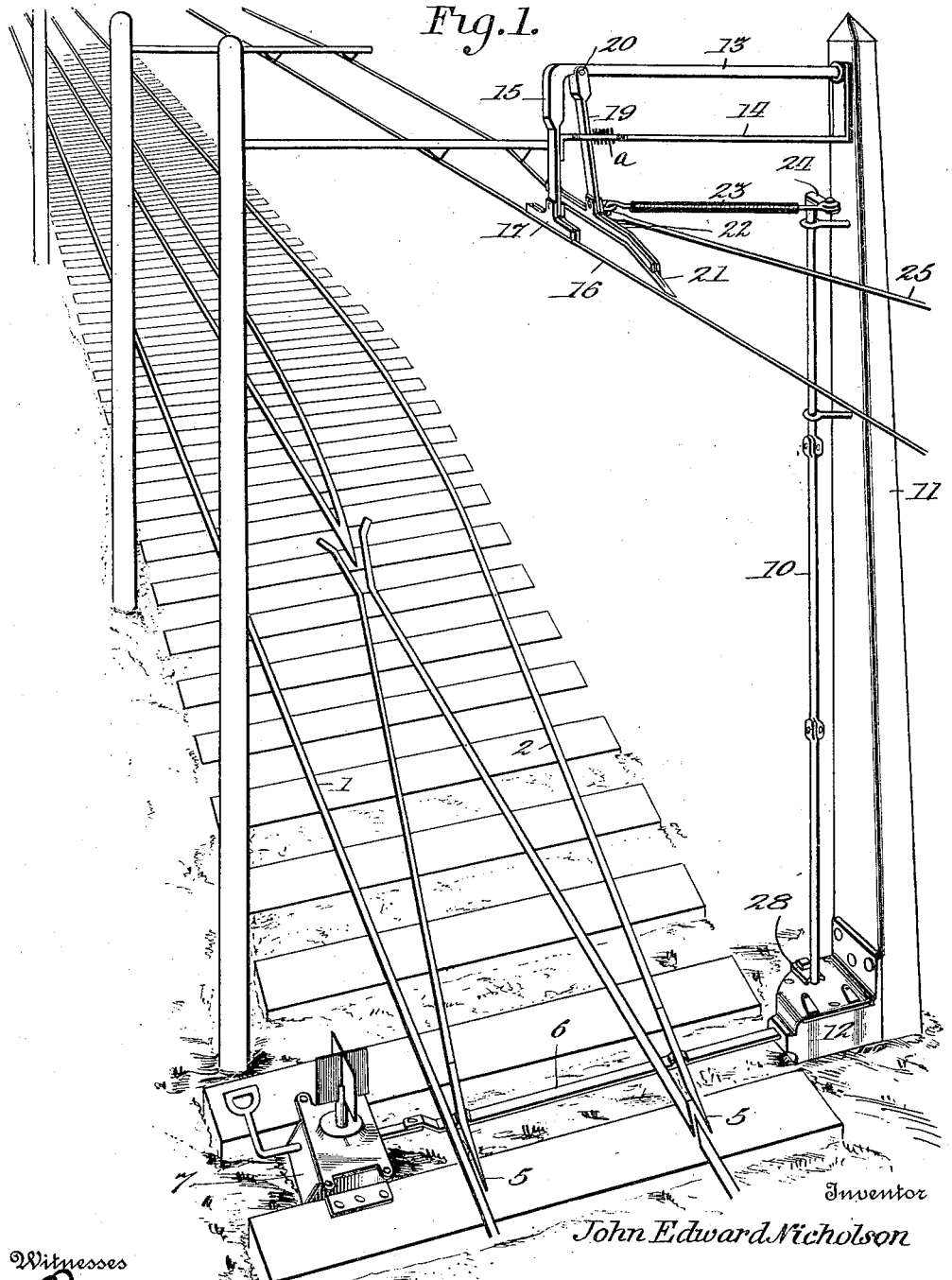

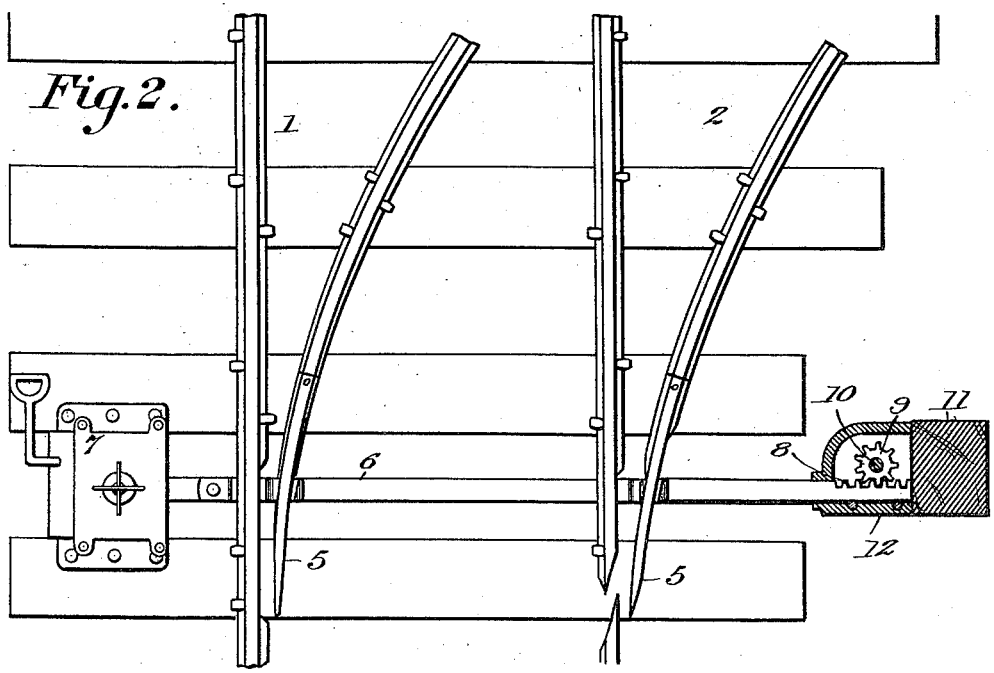
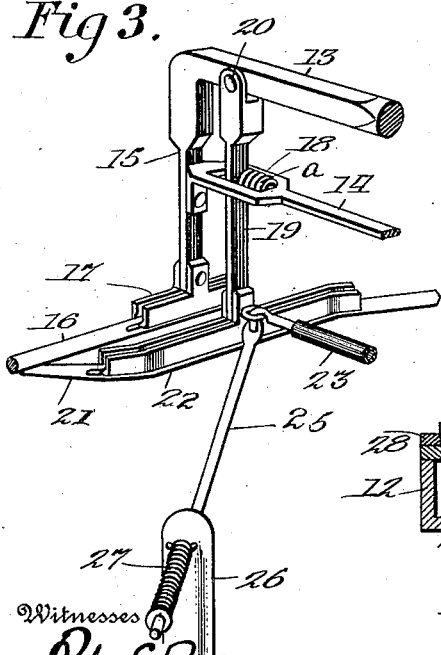
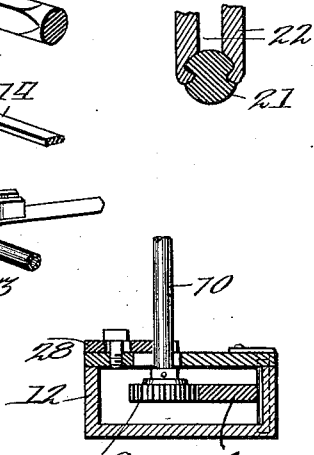
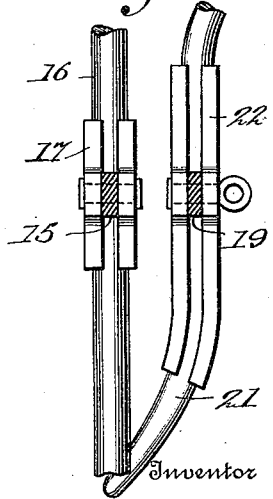

JOHN EDWARD NICHOLSON, OF ELKHART, ILLINOIS, ASSIGNOR OF ONE-HALF TO DARREL NICHOLSON, OF DEXTER, KANSAS.

COMBINED TRACK AND TROLLEY SWITCH OPERATING MECHANISM.

1,024,353. Specification of Letters Patent. Patented Apr. 23, 1912.

Application filed February 15, 1911. Serial No. 608,732.

*To all whom it may concern:*

Be it known that I, JOHN EDWARD NICHOLSON, a citizen of the United States, residing at Elkhart, in the county of Logan and State of Illinois, have invented new and useful Improvements in Combined Track and Trolley Switch Operating Mechanism, of which the following is a specification.

The present invention has for its object to devise a novel mechanism whereby a track switch and a trolley switch may be simultaneously operated, thereby admitting of the trolley automatically passing from the main conductor to the switch or vice versa with the car and obviating the necessity for the conductor or other person manipulating the trolley to effect a transfer thereof when the car is switched.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a perspective view of part of a trolley line, showing the connecting means between the track switch and the trolley switch admitting of simultaneous operation of both, said connecting means embodying the invention. Fig. 2 is a horizontal section. Fig. 3 is a detail perspective view of a part of the trolley switch and connecting means. Fig. 4 is a detail view of a part of the trolley switch. Fig. 5 is a top plan view of the trolley switch, the supports being in section. Fig. 6 is a vertical section of the housing, showing the lower portion of the shaft.

Corresponding and like parts are referred to in the following description, and indicated in all the views of the drawings, by the same reference characters.

The main track is indicated at 1 and the siding or branch at 2.

The movable switch points are indicated at 5 and are connected to a switch bar 6, which latter in turn is adapted to be operated by means of a switch stand 7 of ordinary construction arranged at one side of the track. The switch bar 6 has cog teeth 8 either forming a part thereof or applied thereto in any manner, said cog teeth forming a rack and meshing with the teeth of a pinion 9 which is secured to the lower end of a shaft 10. A post 11 is located at one side of the track and the shaft 10 is mounted in bearings applied thereto. A housing 12 is fitted to the lower portion of the post 11 and receives the end portion of the switch bar having the rack teeth and also incloses the pinion 9 and forms a bearing for the lower end of the shaft 10 and a guide for the outer end of the switch bar 6. The housing 12 may be of any suitable structure admitting of the attainment of the objects stated.

Two arms or supports 13 and 14 project horizontally from the post 11 and sustain a vertical bar 15 at their outer ends, said bar 15 being preferably an end portion of the arm 13 bent about at a right angle so as to occupy approximately a vertical position. The main conductor 16 is connected to the lower end of the vertical bar 15 by means of clamp members 17, the latter serving to strengthen the conductor and being secured to opposite sides of the bar 15. The outer end of the arm 14 is bolted or otherwise secured to the bar 15 and has an opening 18 through which a hanger 19 passes, said hanger being pivotally connected at its upper end to the arm 13 at 20 and having the trolley switch 21 connected to its lower end by means of clamp members 22. A spring is located in the opening 14 and exerts a lateral pressure against the hanger 19 to yieldingly hold the switch 21 against the conductor 16. The clamp members 22 extend along opposite sides of the trolley switch 21 a distance to brace and strengthen the same. The end portion of the trolley switch 21 is laterally deflected and pointed so as to make close connection with the conductor 16, whereby provision is had for transfer of the trolley from the main conductor to the side or branch conductor or vice versa. A rod 23 is connected at one end with the trolley switch 21 and its opposite end is connected to a crank 24 at the upper end of the shaft 10. The bolt connecting the clamp members 22 to the hanger 19 has an eye at one end which is looped into an eye at the end of the rod 23.

It will be understood that movement of the switch bar 6 will effect a turning of the shaft 10 by reason of the pinion 9 and rack 8 and as the shaft 10 turns the hanger 19 will receive a lateral movement through the instrumentality of the crank 24 and connection 23, the direction of movement of the hanger 19 serving to carry the trolley switch 21 toward or away from the main conductor 16 according to the movement of the switch bar 6. The parts are so arranged that upon closing the track switch with reference to the main track the trolley switch will likewise be closed with reference to the main conductor and upon moving the switch operating mechanism to open the track switch the trolley switch will likewise be opened. The construction admits of the trolley being automatically controlled at the switch so that when the car passes from the main track to the branch the trolley is likewise automatically transferred from the main conductor to the branch conductor.

The invention does not require the attention of the conductor to manipulate the trolley at the switch, hence he may attend to other duties looking to the safety of the passengers or to prevent any casualty which is frequently attributable to the attention of the conductor being otherwise occupied in order to effect a transfer of the trolley from one line to the other.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

The shaft 10 is preferably composed of sections which are coupled by means of universal joints, thereby admitting of the housing 12 being located out of line with the bearings supporting said shaft upon the post 11. The parts 13 and 14 are electrically insulated from the post 11 and the connection 23 comprises sections which are electrically insulated, thereby preventing transmission of the current from the trolley line to the shaft. A rod 25 has connection with the trolley switch 21 and is supported upon a post 26, a spring 27 being mounted upon the rod and exerting a pressure thereon to hold the switch closed and yet admit of separation when the trolley wheel passes between the switch 21 and the main line 16. A slide 28 closes an opening in the top of the housing through which the shaft 10 passes and is adjustable so that the pinion 9 may be caused to properly mesh with the cog teeth 8.

Having thus described the invention what is claimed as new, is:—

1. In a trolley line, the combination of an arm, means for connecting the conductor with said arm, a hanger pivotally connected at its upper end with said arm, means for connecting a trolley switch with the lower end of said hanger, and a second arm forming a guide for said hanger.

2. In a trolley line, the combination of an arm, means for connecting the conductor with said arm, a hanger pivotally connected at its upper end with said arm, means for connecting a trolley switch with the lower end of said hanger, a second arm having an opening through which the hanger passes and is directed in its movements thereby, and a spring located in the opening of the second arm and exerting a lateral pressure against the hanger to hold the trolley switch in engagement with the conductor.

3. In a trolley line, the combination of an arm having a pendent portion at one end, a second arm forming a brace for the pendent portion and having an opening therein, a hanger passing through the opening of the second arm and pivoted to the first mentioned arm, a main conductor supported by the pendent portion of the first mentioned support, a branch conductor attached to said hanger, and means for operating the hanger to throw the branch conductor into or out of engagement with the main conductor.

In testimony whereof I affix my signature in presence of two witnesses.

JOHN EDWARD NICHOLSON.

Witnesses:
R. L. HINMAN,
JOHN FOLLIS.

Copies of this patent may be obtained for five cents each, by addressing the "Commissioner of Patents, Washington, D. C."